United States Patent [19]

Ganci

[11] Patent Number: 4,469,523
[45] Date of Patent: Sep. 4, 1984

[54] BORAX DISPERSION MILLING OF QUINACRIDONES

[75] Inventor: James B. Ganci, Wilmington, Del.

[73] Assignee: E. I. Du Pont de Nemours and Company, Wilmington, Del.

[21] Appl. No.: 512,687

[22] Filed: Jul. 11, 1983

[51] Int. Cl.³ ............................................. C09B 67/04
[52] U.S. Cl. ................................ 106/309; 106/288 Q; 260/245.87
[58] Field of Search ............................ 106/309, 288 Q

[56] References Cited

U.S. PATENT DOCUMENTS

| | | | |
|---|---|---|---|
| 2,402,167 | 6/1946 | Lang et al. ...................... | 260/245.87 |
| 2,816,114 | 12/1957 | Ehrich et al. ................... | 260/245.74 |
| 3,598,625 | 8/1971 | Buckwalter ...................... | 106/309 |
| 3,657,248 | 4/1972 | Wagener .......................... | 546/49 |
| 4,287,000 | 9/1981 | Buckwalter ...................... | 106/309 |
| 4,371,643 | 2/1983 | Thomas ........................... | 106/309 |

Primary Examiner—Helen M. McCarthy

[57] ABSTRACT

A process of reducing the particle size of oversize crude quinacridones to pigmentary grade material by ball or rod milling the crude quinacridone with 3–10 parts per part by weight pigment of borax pentahydrate and 5–40% by weight, based on pigment, of a monohydric alcohol containing 4–8 carbon atoms of a polyethylene glycol having a molecular weight of 150–600.

7 Claims, No Drawings

BORAX DISPERSION MILLING OF QUINACRIDONES

BACKGROUND OF THE INVENTION

1. Field of the Invention

The present invention relates to a milling process for converting large particle size crude quinacridones to pigmentary grade material.

2. Prior Art

U.S. Pat. No. 2,402,167 discloses salt milling crude organic pigments in a ball mill to produce pigmentary grade material.

U.S. Pat. No. 2,816,114 discloses agitating a crude organic pigment with borax, water and a dispersing agent to produce pigmentary grade material.

U.S. Pat. No. 3,657,248 discloses salt milling crude quinacridone in the presence of a phase directing agent to reduce its particle size and produce beta-phase quinacridone.

U.S. Pat. No. 4,287,000 discloses salt milling oversize crude organic pigment in the presence of an organic conditioning liquid.

SUMMARY OF THE INVENTION

The present invention relates to a process of milling oversize crude quinacridone with borax hydrates and an alcohol or polyethylene glycol. The resulting mill powder is slurried with water and treated with a dilute strong acid at elevated temperature to remove entrained iron from the milling elements. Optionally, a finishing agent is added during the acid treatment.

DETAILED DESCRIPTION

The present invention is useful to prepare pigmentary grade quinacridones from oversize particles of crude quinacridone. Suitable quinacridones for use herein include quinacridonequinone and quinacridones of the formula:

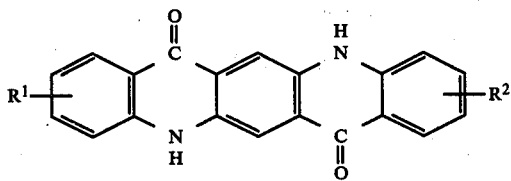

wherein —$R^1$ and —$R^2$ are the same or different and are selected from the group consisting of —H, —F, —Cl, —$CH_3$ and —$OCH_3$. The quinacridone may be present as a single one of the above described or as a mixture. Also contemplated are solid solutions of the above-described quinacridones with stabilizers such as dihydroquinacridone or antiflocculents such as phthalimidomethylquinacridone.

Generally the borax hydrate, $Na_2B_4O_7.XH_2O$ will be present in from 3–10 times, by weight, the amount of pigment present in the mill charge. The optimum quality pigment is produced at about 4 times, by weight of pigment of borax hydrate. Use of larger amounts (than 4X) of borax hydrate does not cause the quality of pigment product to deteriorate but is unnecessary.

Also included in the charge to the mill is from 5–40%, by weight, based on pigment of an alcohol containing 4–8 carbon atoms such as pentanol or cyclohexanol; or polyethylene glycols having a molecular weight of from 150–600. Glycols such as ethylene glycol or hexylene glycol are unsatisfactory for use in the present invention. The system should be free of water since as little as 2% "free" water, based on pigment, can cause the pigment to be noticeably lighter in masstone. Generally the presence of a surface modifying agent such as 1% benzyl tributyl ammonium chloride is advantageous in the milling step.

The conditons applicable to the milling operation are not especially critical. The mill loading is substantially conventional for ball milling operations. Thus, it is conventional for the charge of grinding media to occupy about half of the volume of the mill and for the material being ground to essentially occupy the voids between these media. It is quite possible to increase the charge with some increase in the milling time. The choice of these conditions is well within the skill of one versed in this type of operation. The preferred grinding media in the mills are the rod type, which may vary in size; but it is quite possible to use ordinary round steel balls varying from ⅛ inch in diameter up to ½ inch in diameter or more in the operation. When round balls are used there is marked tendency for the charge to cake in the mill under some conditions, which tendency generally can be avoided by the addition of materials of an irregular shape, such as nails, to the charge. The use of the rod type grinding media usually avoids this caking.

It is impossible to set up limits as to the length of the milling cycle; since it will vary depending upon the pigment being treated, the milling loading and the type of mill being used. In order to establish the optimum length of time for milling a particular pigment under a given set of conditions, it is recommended that the invention be run with variations in the milling time and the samples evaluated for the best balance of properties such as color strength and intensity and dispersibility. A minimum of 4–6 hours is usually required, and this may be extended to as much as 12–18 hours or even more in a commercial scale mill. Considerably longer times are required when using a laboratory or semi-works scale mill.

The mill powder is slurried in water and the pigment normally is ripened in a hot dilute acid such as 1.5% sulfuric acid and at the same time any metal which has become associated with the pigment during milling is extracted. Generally the presence in the extraction step of a small amount of a particle size growth inhibitor, such as quinacridone mono-sulfonic acid, is desirable.

EXAMPLES

Example 1

Five grams 2,9-dichloroquinacridone, 20.0 g borax decahydrate, 2.0 ml pentanol, 1500 g ½ inch $(1.27 \times 10^{-2}$ m) diameter steel balls and 150 g roofing nails are charged to a 1 quart $(9.5 \times 10^{-4}$ m$^3$) laboratory scale mill and the mill rotated at 70% of its critical speed (the critical speed is the speed at which centrifugal force overcomes the force of gravity and the contents of the mill are retained against the inner wall of the mill) for 16 hours. The contents of the mill are discharged onto a screen which retains the steel balls and nails. The resulting mill powder is slurried with water at 50° C. The pH is lowered to about 1.5 with sulfuric acid and the temperature raised to 90° C. for several hours. The product is recovered by filtration and dried. When compared by rubout with a 2,9-dichloroquinacridone which has been milled and worked up under the same conditions but substituting alum for the borax decahydrate, the pigment is stronger and brighter in tint.

Example 2

A one quart ($9.5 \times 10^{-4}$ m$^3$) laboratory scale mill is charged with 10 g crude beta-quinacridone, 40 g borax pentahydrate, 0.6 ml cyclohexanol, 0.2 g of 50% solution of benzyl tributyl ammonium chloride in a mixture of water and hexylene glycol, 1500 g ½ inch ($1.27 \times 10^{-2}$ m) steel balls and 150 g roofing nails. The mill is rotated at 70% of its critical speed for 24 hours, after which its contents are discharged over a screen which retains the steel balls and nails. The resulting mill powder is slurried with water at 50° C. Then 12.5 ml of a slurry containing 0.42 grams quinacridone mono-sulfonic acid is added, the pH lowered to about 1.5 and the temperature raised to 90° C. for several hours. The product is recovered by filtration and dried. The product exhibits high tinctorial strength and excellent dispersibility in both a thermosetting acrylic enamel and an alkyd automotive finish.

Example 3

A semi-works scale mill is charged 40 lbs (18.2 Kg) granular borax pentahydrate, 10 lbs (4.5 Kg) beta-quinacridone, 360 ml ($3.6 \times 10^{-4}$ m$^3$) polyethylene glycol having a molecular weight of 400, 0.1 Kg of a 44% solution of benzyl tributyl ammonium chloride in a mixture of water and hexylene glycol, 1000 lbs (454 Kg) "Cyl Pebs", steel cylinders ⅝ inch (0.016 m) in diameter by ⅝ inch (0.016 m) in length and 100 lbs (45.4 Kg) 20 penny 4 inch (0.1 m) nails. The mill is rotated at 70% of its critical speed for 24 hours. The internal temperature of the mill is 56° C. The mill is discharged over a screen which retains the "Cyl Pebs" and nails. The mill discharges readily without caking to provide a 96% recovery of the mill powder.

Sixty gallons (0.227 m$^3$) water is added to a large tub fitted with an agitator and heated to 50° C. Ninety pounds (41 Kg) of the mill powder is added porton wise to the tub and then stirred for ½ hour. A slurry of 0.32 Kg quinacridone mono-sulfonic acid in 0.007 m$^3$ 30% sulfuric acid is gradually added to the tub over a period of 20 minutes. Thirty-one pounds (14 Kg) of 96% sulfuric acid is then slowly added to bring the pH to below 2. The tub is heated to and maintained at 90° C. for 2 hours. Four pounds (1.8 Kg) of alum are added to the tub and the solution cooled to 70° C. by addition of water. The slurry is pumped to a filter press, filtered and washed to a resistivity of 95% of the incoming wash water. The resulting wet press cake is dried at 80°–84° C. yielding 17 lbs (7.7 Kg) of a dry lump, which is pulverized in a hammer mill using a high speed setting with a 0.066 inch ($1.67 \times 10^{-3}$ m) screen yielding 16.5 lbs (7.05 Kg). When tested in an alkyd coating system, the resulting pigment exhibits unusually high intensity in red blends with a commercial lead molybdate orange vs. commercial beta-quinacridone pigments.

I claim:

1. In a process for converting oversize crude pigment consisting essentially of quinacridonequinone or at least one quinacridone of the formula:

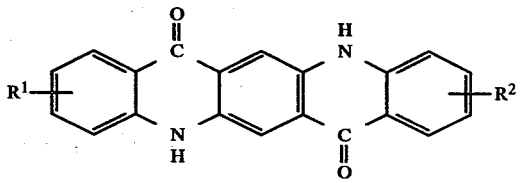

wherein —R$^1$ and —R$^2$ are the same or different and are selected from the group consisting of —H, —F, —Cl, —CH$_3$ and —OCH$_3$ in a system substantially free of free water, the improvement consisting essentially of milling said crude pigment in a ball or rod mill in the presence of from 3–10 times by weight based on pigment of borax hydrate and from 5–40% by weight based on pigment of a liquid which is a monohydric alcohol containing from 4–8 carbon atoms or a polyethylene glycol of 150–600 molecular weight and recovering a pigmentary grade quinacridone material.

2. The process of claim 1 wherein at least about 4 parts by weight of borax pentahydrate per part of pigment is present in the milling step.

3. The process of claim 2 wherein the liquid is a monohydric alcohol.

4. The process of claim 3 wherein the pigment is beta-quinacridone.

5. The process of claim 4 wherein the alcohol is pentanol.

6. The process of claim 4 wherein the alcohol is cyclohexanol.

7. The process of claim 2 wherein the liquid is a polyethylene glycol having a molecular weight of about 400.

* * * * *